United States Patent
Park

(10) Patent No.: US 8,826,061 B2
(45) Date of Patent: Sep. 2, 2014

(54) TIMER, METHOD OF IMPLEMENTING SYSTEM TIME USING A TIMER, AND INTEGRATED CIRCUIT DEVICE INCLUDING THE SAME

(75) Inventor: Jong-Lae Park, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 430 days.

(21) Appl. No.: 13/229,275

(22) Filed: Sep. 9, 2011

(65) Prior Publication Data

US 2012/0072760 A1  Mar. 22, 2012

(30) Foreign Application Priority Data

Sep. 17, 2010 (KR) .................. 10-2010-0092029

(51) Int. Cl.
| | |
|---|---|
| G06F 1/04 | (2006.01) |
| H03L 7/00 | (2006.01) |
| H03B 5/08 | (2006.01) |
| H03B 5/10 | (2006.01) |
| G01F 15/06 | (2006.01) |
| H03K 23/00 | (2006.01) |
| H03K 21/38 | (2006.01) |
| G04F 1/00 | (2006.01) |

(52) U.S. Cl.
USPC ........... 713/502; 327/151; 327/160; 331/172; 331/177 R; 377/19; 377/39; 377/107; 702/176

(58) Field of Classification Search
CPC .................................. G06F 1/14; G06F 1/324
USPC ....... 713/502; 327/151, 160; 331/172, 177 R; 377/19, 39, 107; 702/176
See application file for complete search history.

(56) References Cited

U.S. PATENT DOCUMENTS

| | | | | |
|---|---|---|---|---|
| 4,161,787 A * | 7/1979 | Groves et al. | ................. | 710/260 |
| 4,939,755 A * | 7/1990 | Akita et al. | ..................... | 377/39 |
| 5,594,894 A * | 1/1997 | Mitra | ............................ | 713/501 |
| 5,606,713 A | 2/1997 | Wisor et al. | | |
| 5,708,817 A * | 1/1998 | Ng et al. | ....................... | 710/266 |
| 6,263,450 B1 * | 7/2001 | Predko | .......................... | 713/502 |
| 6,839,654 B2 * | 1/2005 | Rollig et al. | .................. | 702/178 |
| 7,284,142 B2 | 10/2007 | Noha et al. | | |
| 7,461,283 B2 | 12/2008 | Andrianov | | |
| 2008/0159059 A1* | 7/2008 | Moyer | .......................... | 365/236 |

FOREIGN PATENT DOCUMENTS

KR  1999-0069963  9/1999

* cited by examiner

*Primary Examiner* — Stefan Stoynov
(74) *Attorney, Agent, or Firm* — Muir Patent Consulting, PLLC

(57) ABSTRACT

A method of implementing a system time in an electronic device using a timer is disclosed. The method comprises storing a first count reset value in the electronic device; increasing a count value; comparing the first count reset value with the count value at a first particular time; resetting the count value when the count value is the same as the first count reset value at the first particular time; and generating an interrupt request signal when the count value is reset.

11 Claims, 14 Drawing Sheets

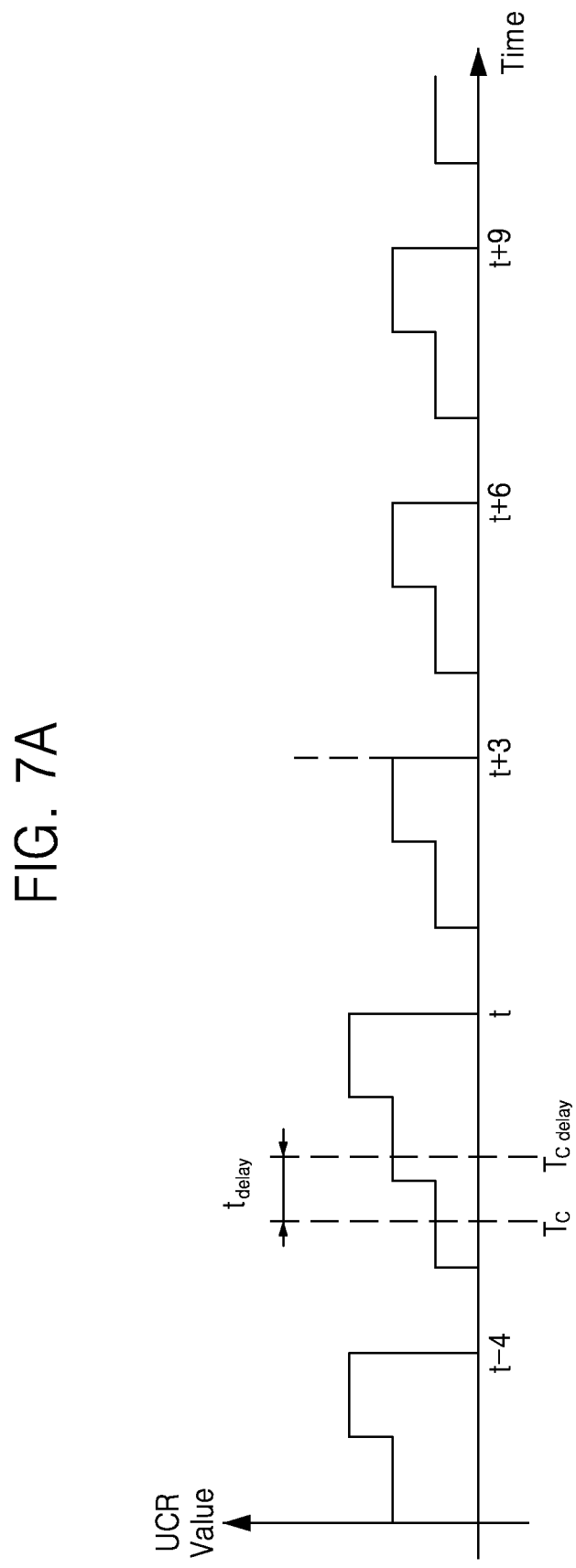

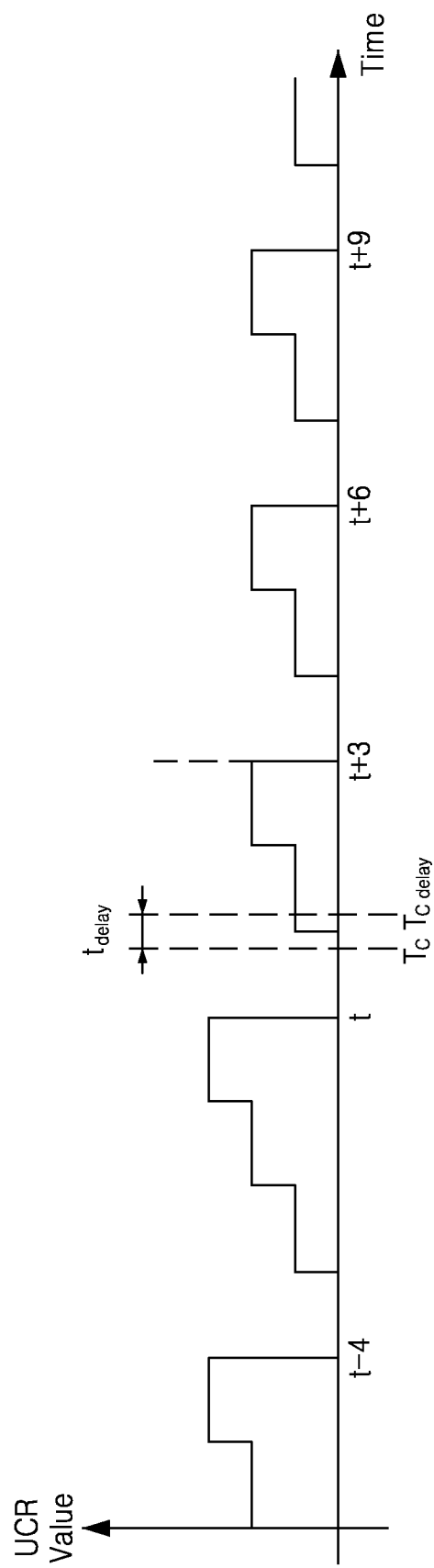

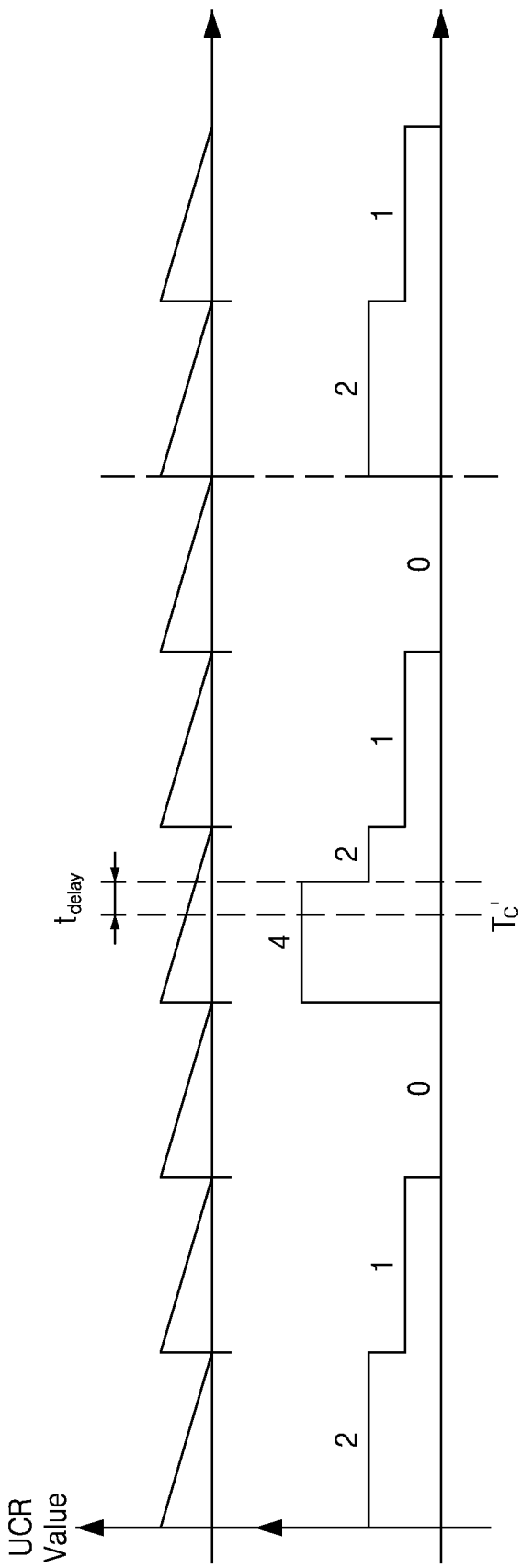

TIMER, METHOD OF IMPLEMENTING SYSTEM TIME USING A TIMER, AND INTEGRATED CIRCUIT DEVICE INCLUDING THE SAME

CROSS-REFERENCE TO RELATED APPLICATIONS

This application claims priority under 35 U.S.C. §119(a) from Korean Patent Application No. 10-2010-0092029 filed on Sep. 17, 2010, the disclosure of which is hereby incorporated by reference in its entirety.

BACKGROUND

The present disclosure relates to a timer and an integrated circuit (IC) device including the same, and more particularly, to a timer, which is easy to be realized and has high accuracy, and an IC device including the same.

System time is time that is referred to when a process/program is executed in an operating system (OS). The system time is calculated using a timer that has a set period spanning a set amount of real time, such that each period counts as a unit of time. In general, the unit of time for the system time is maintained to have a fixed period, but it may be necessary or desirable to change the period of the system time, for example, in order to reduce power consumption.

When the period of a conventional timer is changed, users need to directly input a changed period. As a result, the accuracy of the timer is decreased depending on when the changed period is input.

SUMMARY

Some embodiments of the present invention provide a timer, which is easy to be realized and has high accuracy and stability, and an integrated circuit (IC) device including the same.

According to some embodiments, there is provided a timer including a first buffer configured to set a first count reset value; a register block configured to receive the first count reset value from the first buffer, increase a count value, and reset the count value when the count value is the same as the first count reset value at a first particular time; and a timer interrupt generator configured to receive a reset information that the count value is reset from the up-counting timer block and generate an interrupt request signal.

According to some embodiments, there is provided a method of implementing system time using a timer. The method includes the operations of storing a first count reset value in an electronic device; increasing a count value; comparing the first count reset value with the count value at a first particular time; resetting the count value when the count value is the same as the first count reset value at the first particular time; and generating an interrupt request signal when the count value is reset.

The method may include dividing a frequency of a first clock signal received from a clock generator and generating a second clock signal divided from the first clock signal, and increasing the count value in synchronization with the second clock signal.

According to some embodiments, there is provided a method of operating timer. The method includes the operations of storing a first count reset value and second count reset value; increasing a count value; comparing the count value with the first count reset value and the second count reset value at a particular time; resetting the count value when the count value is the same as the first count reset value or the second count reset value at the particular time; and generating an interrupt request signal when the count value is reset.

BRIEF DESCRIPTION OF THE DRAWINGS

The above and other features and advantages of the present disclosure will become more apparent by describing in detail exemplary embodiments thereof with reference to the attached drawings in which:

FIGS. 7A and 7B are diagrams for explaining system time with a variable period according to some embodiments; and FIGS. 8A and 8B are diagrams for explaining a comparison example of system time with a variable period.

DETAILED DESCRIPTION OF THE EMBODIMENTS

Figure 1:
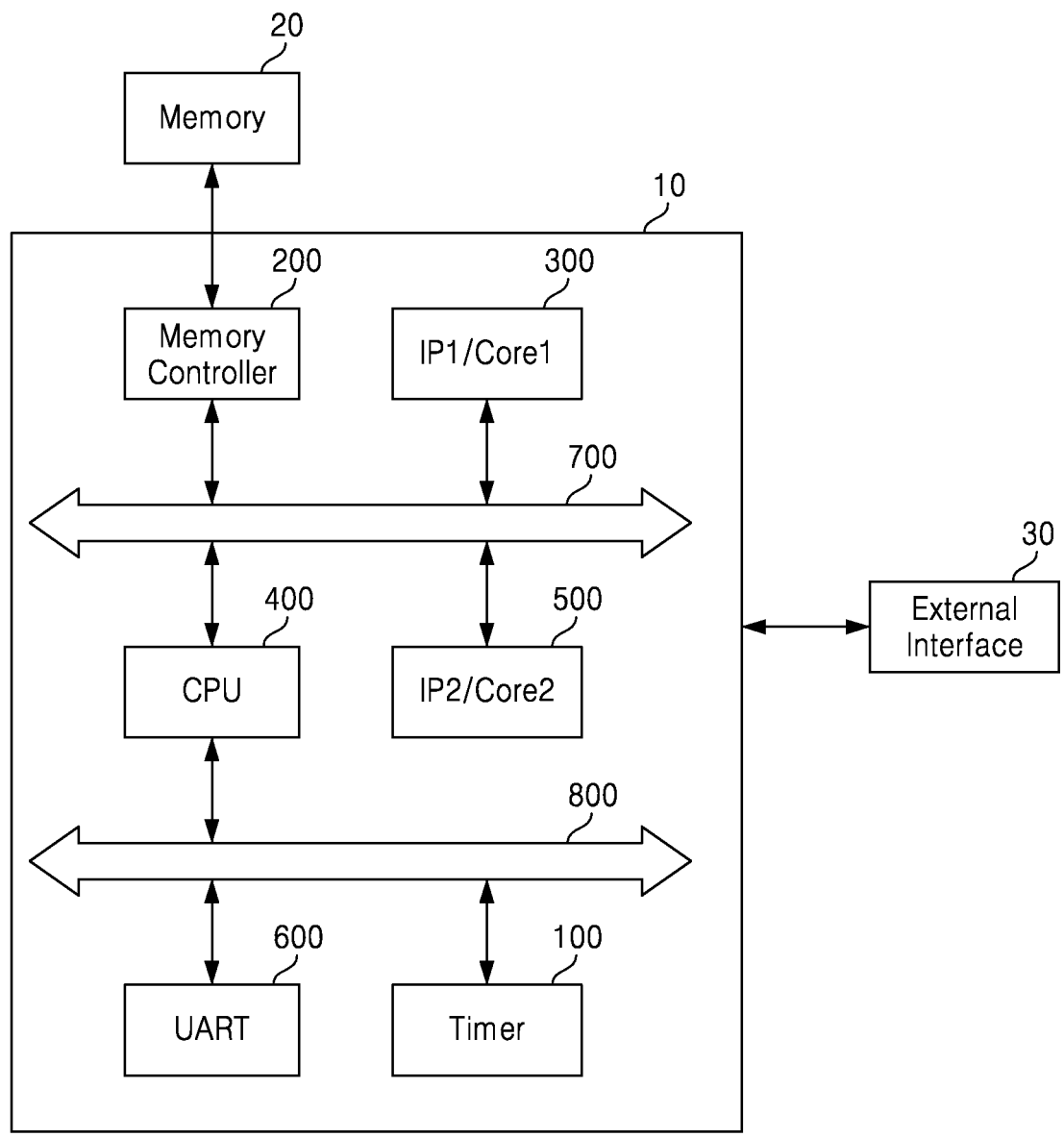
FIG. 1 is a functional block diagram of a system on chip (SOC) according to some embodiments.

The present disclosure now will be described more fully hereinafter with reference to the accompanying drawings, in which embodiments of the disclosure are shown. This invention may, however, be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

A timer on a computer or other electronic device may keep track of time based on a clock signal. That is, the clock signal may have a frequency of, for example, 1 MHz, and the timer may be set to keep track of time, for example, in units of 1 ms. In this example, 1000 clock cycles would make up one unit of time (1 ms). In such a system, to count units of time, the computer may include circuitry configured to count the number clock cycles up to a predetermined count value (e.g., 1000), and then when the number of clock cycles reaches that value, increment a system counter to indicate that one unit of time has passed. Also, when the number of clock signals reaches the predetermined count value, the clock cycle counter is reset back to 0, at which point it begins to count up to 1000 again.

One way to determine whether a clock cycle count has reached the predetermined count value is, at each clock cycle, to compare the value of the clock cycle counter with the predetermined count value. If they are equal, then the clock cycle count has reached the predetermined count value, and the clock cycle counter can be reset to 0.

In some systems, it may be desirable or necessary to change the length of a system unit of time (i.e., a timer period) during certain operations. To do so, the system would update (i.e., change) the predetermined count value. For example, if the system needs to change the unit of time from 1 ms to 2 ms, then the predetermined count value can be changed to 2000, such that it counts to 2000 before it is reset.

If it is desired to change a predetermined count value during the timer operation, however, a problem can arise when the predetermined count value is reduced to a second value lower than the original predetermined count value, after the clock cycle counter is already greater than the second value. In such a situation, the clock cycle counter continues to count up, and never equals the second value because the second value is less than the clock cycle counter value as soon as the second value is set. To address this problem, the system can be configured so that the predetermined count value is only changed at the beginning of each timer period. However, there still may be times when the predetermined count value is instructed to be changed to a very small value that may still be smaller than the current clock cycle counter value at that time. In addition, there may be situations where an instruction to change the predetermined count value is unexpectedly delayed, such that it is not received until after the clock cycle counter value has increased past the updated predetermined count value.

To address these problems, the timer system and method described below may be implemented.

FIG. 1 is a functional block diagram of a system on chip (SOC) 10 according to some embodiments. The SOC 10 includes a memory controller 200, a first core (IP1/Core1) 300, a central processing unit (CPU) 400, a second core (IP2/Core2) 500, a universal asynchronous receiver/transmitter (UART) 600, a first bus 700, a second bus 800, and a timer 100. The SOC 10 enables an entire system including a processor core, a memory unit, a high performance bus, and a programmable logic to be embedded in a single semiconductor core through the development of integrated circuit (IC) technology.

The timer 100, the memory controller 200, the first core 300, the CPU 400, the second core 500, and the UART 600 may be connected to one another through the first and second buses 700 and 800. The first and second buses 700 and 800 may be exclusive or commercially standard. The first bus 700 may be an AHB bus and the second bus 800 may be an APB bus, but the present disclosure is not restricted thereto.

The SOC 10 may be connected with a memory 20 and an external interface 30 and may transfer data between the memory 20 and the external interface 30. The memory controller 200 is connected with the memory 20 and controls the memory 20.

The first core 300 and the second core 500 may be types of semiconductor cores. The examples of such cores include at least one general-purpose processor or computer processor and/or digital signal processor (DSP); a large-capacity memory in a form of a memory array such as read-only memory (ROM), random access memory (RAM), electrically erasable programmable ROM (EEPROM), and/or flash; a timing source including an oscillator and/or a phase locked loop; a peripheral device including a counter timer, a real-time timer, and a power-on reset generator; a voltage regulator and a power management module; an analog interface including an analog-to-digital converter (ADC) and a digital-to-analog converter (DAC); and an external interface including various elements on a single monolithic substrate, but the disclosure is not restricted thereto. The embodiments disclosed herein can be used in any of the electronic devices described above, or in other electronic devices.

The timer 100 measures system operating time and may keep track of system time in a fixed or variable period. The timer 100 will be described in detail with reference to FIG. 2.

FIG. 1 shows only examples of functional cores necessary to explain embodiments of the present disclosure. It will be apparent to those of ordinary skill in the art that other elements not shown in FIG. 1 may be provided or operate in associated with or independently of the elements shown in FIG. 1 for the appropriate performance of the function of the SOC 10. For example, each functional core may be implemented with circuits using various elements, such as oscillators, transistors, capacitors, buffers, inverters, logic gates, etc., connected to appropriate power sources, signal sources, etc.

Figure 2:
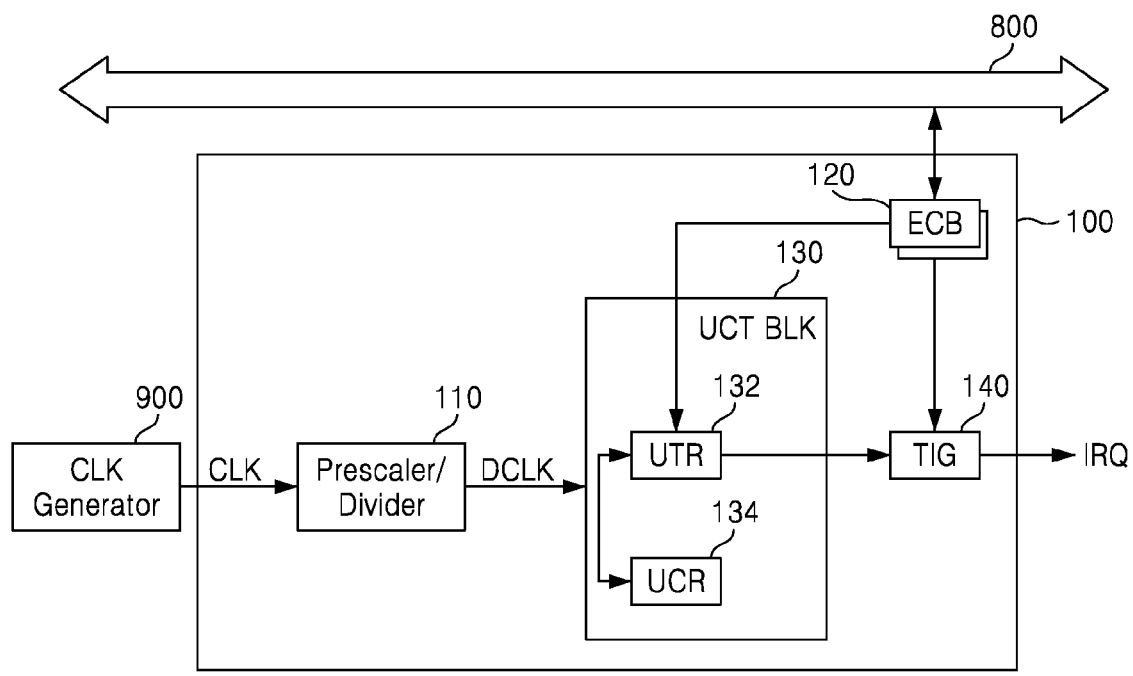
FIG. 2 is a diagram of a timer according to some embodiments.

FIG. 2 is a diagram of the timer 100 according to some embodiments. Referring to FIG. 2, the timer 100 includes a prescaler/divider 110, an expire count buffer (ECB) 120, an up-counting timer (UCT) block 130, and a timer interrupt generator (TIG) 140. The elements shown in FIG. 2 are conceptual blocks, and may be implemented with circuits and other hardware elements using various elements, such as oscillators, transistors, capacitors, buffers, inverters, logic gates, etc., connected to appropriate power sources, signal sources, etc.

The UCT 130 includes an up-counting timer reset (UTR) block 132 and an up-counting register (UCR) 134.

In one embodiment, the prescaler/divider 110 receives an operating clock signal CLK generated by a clock generator 900 inside or outside the timer 100, divides it into an internal operating clock signal, and provides the internal operating clock signal to the UCT block 130.

In one embodiment, the ECB 120 receives a control signal from the CPU 400 through the second bus 800, stores a count reset value at which the UCR 134 is reset (i.e., a predetermined count value as described above), and transmits the count reset value to the UTR block 132. There may be provided two or more ECBs. When two or more ECBs are provided, two or more count reset values may be stored and set.

The ECB 120 may transmit the count reset value to the UTR block 132 and the TIG 140. In one embodiment, the ECB may change the reset count values even though the UCR 134 is operating.

The UCR 134 increases a UCR value (i.e., the clock cycle counter described above) from 0 in synchronization with the internal operating clock signal received from the prescaler/divider 110. When the UCR value is the same as the count reset value, the UCR value is reset to 0.

The UCR 134 may be connected with an up-counting observation block (not shown). The up-counting observation block may be connected to the second bus 800 and transmit the UCR value to external cores through the second bus 800 so that the cores display the UCR value.

The UTR block 132 is connected with the UCR 134. When the count reset value is the same as the UCR value, the UTR block 132 resets the UCR value to 0 at the UCR 134 and feeds back that information that the increasing count value has been reset to the TIG 140.

The TIG 140 generates an interrupt request signal IRQ in response to the feedback from the UTR block 132. The TIG 140 may enable or disable the interrupt request signal IRQ. In one embodiment, the IRQ signal may be used as a system counter to count the number of timer periods that have passed during certain operations or processes.

Figure 3A:
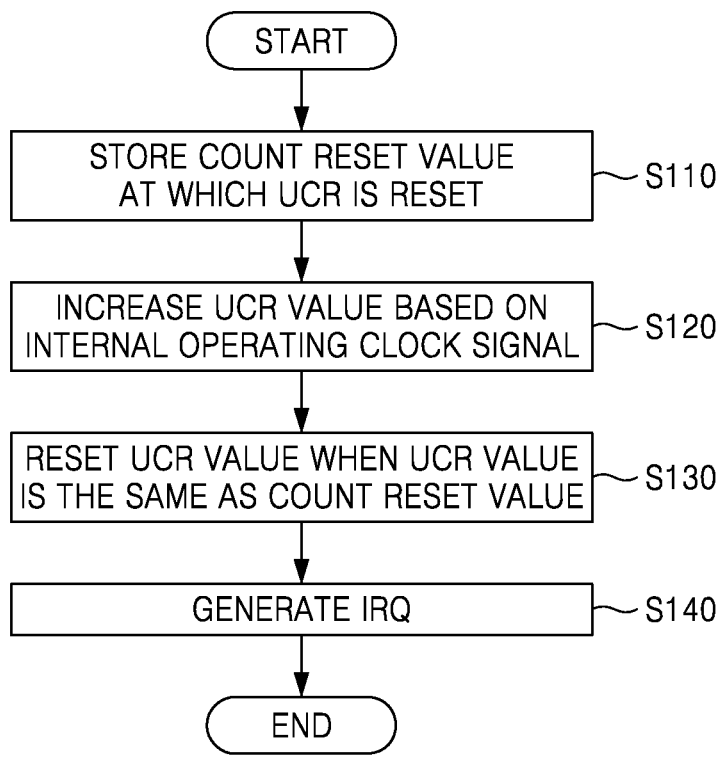
FIGS. 3A and 3B are flowcharts of methods of implementing system time according to some embodiments.

FIG. 3A is a flowchart of a method of implementing system time according to some embodiments. The method illustrated in FIG. 3 may be performed by the timer 100 illustrated in FIG. 2.

Referring to FIGS. 2 and 3A, after an interrupt service routine (ISR) is defined, the ECB 120 stores a count reset value in operation S110. In addition, two or more ECBs may be provided. When two or more ECBs are provided, two or more count reset values may be stored. The count reset value is stored so that the UCR value is reset to 0 when the UCR value increasing at the UCR 134 is the same as the count reset value. In one embodiment, as described further below, two ECBs provide two count reset values, one count reset value being a desired count reset value, and other being a backup count reset value.

The UCR 134 increases the UCR value based on an internal operating clock signal in operation S120. For example, the internal operating clock signal may be a frequency-divided clock signal DCLK generated by the prescaler/divider 110 dividing the operating clock signal CLK generated from the clock generator 900. However, in some embodiments, the UCR 134 may increase the UCR value based on an external clock signal or an internal clock signal that does not need to be a divided clock signal.

When the UCR value is the same as the count reset value, the UCR value is reset in operation S130. For example, the UTR block 132 may determine whether the UCR value is the same as the count reset value and may reset the UCR value to 0 when the UCR value is the same as the count reset value.

In addition, when the UCR value is reset to 0, the UTR block 132 informs the TIG 140 of the reset of the UCR value.

The TIG 140 may generate the interrupt request signal IRQ in response to a feedback about the reset of the UCR value in operation S140. When the interrupt request signal IRQ is generated, the system time is updated based on, for example, a system counter counting the number of timer periods that have passed.

Figure 3B:
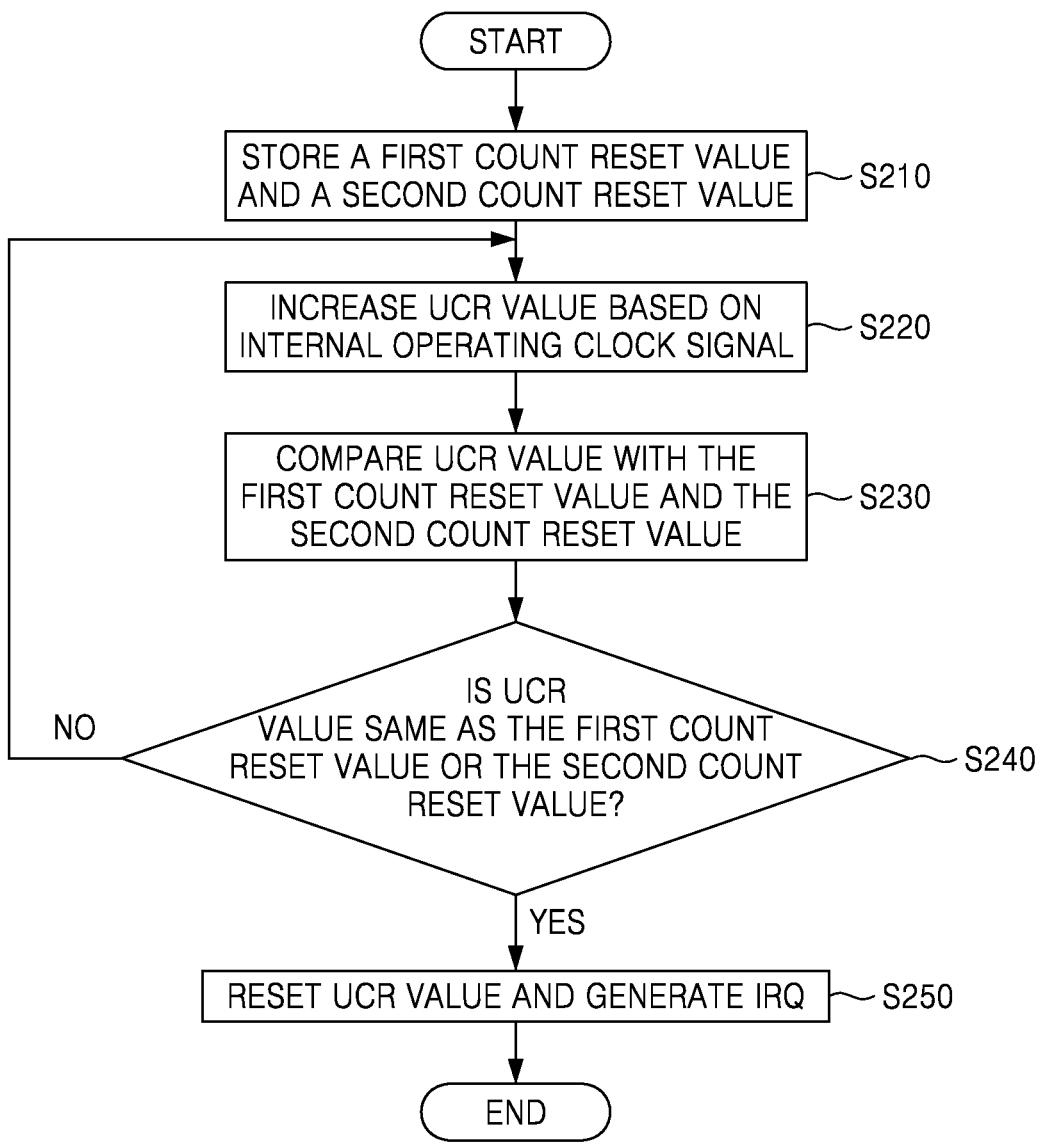

FIG. 3B is a flowchart of a method of operating a timer according to some embodiments. The method illustrated in FIG. 3B may be performed by the timer 100 illustrated in FIG. 2.

Referring to FIGS. 2 and 3B, a first ECB and a second ECB of ECB 120 store a first count reset value and a second count reset value, respectively, in operation S210. The first and second count reset values are stored so that the UCR value is reset to 0 when the UCR value increasing at the UCR 134 is the same as the first count reset value or second count reset value. In one embodiment, the first count reset value may be a desired count reset value at which it is desired that a UCR value is reset to 0, and the second count reset value may be a backup count reset value higher than the desired count reset value, wherein the backup count reset value serves to reset the UCR value in a situation where an initial desired count reset value is changed to a changed value lower than the existing UCR value at the time of the change. The backup count reset value may be selected, in one embodiment, to be twice the value of the changed desired count reset value. In another embodiment, the backup count reset value may be selected to be the same as the original desired count reset value, or an amount higher than the original desired count reset value (e.g., twice the value of the original desired count reset value). However, other values may be used.

The UCR 134 increases the UCR value based on an internal operating clock signal in operation 5220. For example, internal operating clock signal may be a frequency-divided clock signal DCLK generated by the prescaler/divider 110 dividing the operating clock signal CLK generated from the clock generator 900.

The UCR value is compared with the first count reset value and the second count reset value in operation 5230. That is, circuitry may be used that receives the stored first count reset value and the second count reset value from two different buffers (two ECBs), and compares each value to the current UCR value. After comparing, it is determined whether the UCR value is the same as either the first count reset value or the second count reset value in operation 5240.

The UCR value is increased when the UCR value is not the same as either the first count reset value or the second count reset value (S240, NO), and the UCR value is set to 0 when the UCR value is the same as either the first count reset value or the second count reset value (S250). For example, the UTR block 132 may determine whether the UCR value is the same as the first count reset value or the second count reset value and may reset the UCR value to 0 when the UCR value is the same as the first count reset value or the second count reset value. In one embodiment, the first count reset value is a desired count reset value and the second count reset is a backup count reset value higher than the desired count reset value, and at step 5240, it is determined that the UCR value equals the backup count reset value, but does not equal the desired count reset value. As a result, the UCR value is reset (S250).

In addition, in one embodiment, when the UCR value is reset to 0, the UTR block 132 informs the TIG 140 of the reset of the UCR value.

The TIG 140 may generate the interrupt request signal IRQ in response to a feedback about the reset of the UCR value in operation S250. When the interrupt request signal IRQ is generated, the system time is updated based on, for example, a system counter counting the number of timer periods that have passed.

FIGS. 4A through 5B are diagrams for explaining implementation of system time according to example embodiments.

Figure 4A:
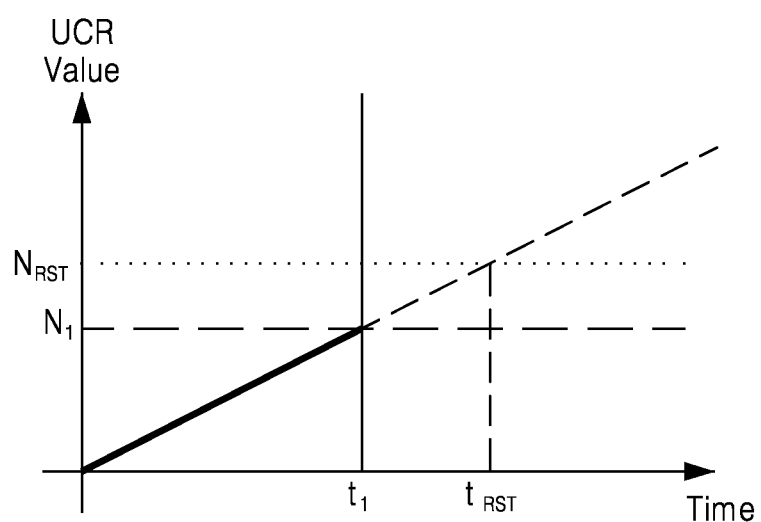
FIGS. 4A through 5B are diagrams for explaining implementation of system time according to some embodiments.
Figure 4B:
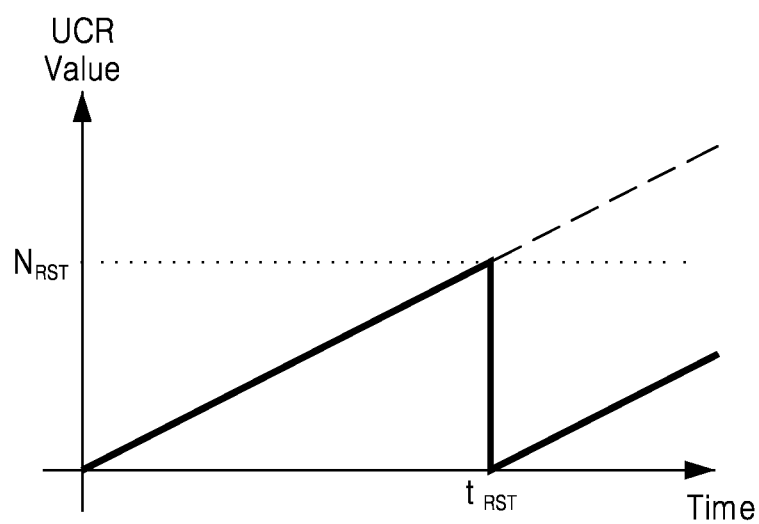

Referring to FIGS. 4A and 4B, when the ECB 120 sets a count reset value $N_{RST}$ at which the UCR 134 is reset, the UCR 134 increases a UCR value from 0 based on the internal operating clock signal DCLK. At a time point $t_{RST}$ when the UCR value is the same as the count reset value $N_{RST}$ as shown in FIG. 4B, the UTR block 132 resets the UCR value to 0 and the UCR 134 newly increases the UCR value starting from 0. This procedure is repeated. The UCR value is reset to 0 by the UTR block 132 and the interrupt request signal IRQ is generated by the TIG 140 in every period when the UCR value is the same as the count reset value $N_{RST}$.

FIGS. 4A and 4B also show a case where when the count reset value $N_{RST}$ is set at a certain time point $t_1$ at which the UCR value is N1, the count reset value $N_{RST}$ is greater than the UCR value of N1 at the certain time point $t_1$. The UCR value continuously increases from the certain time point $t_1$ and becomes the same as the count reset value $N_{RST}$ at the time point $t_{RST}$, at which the UCR value is reset to 0.

Figure 5A:
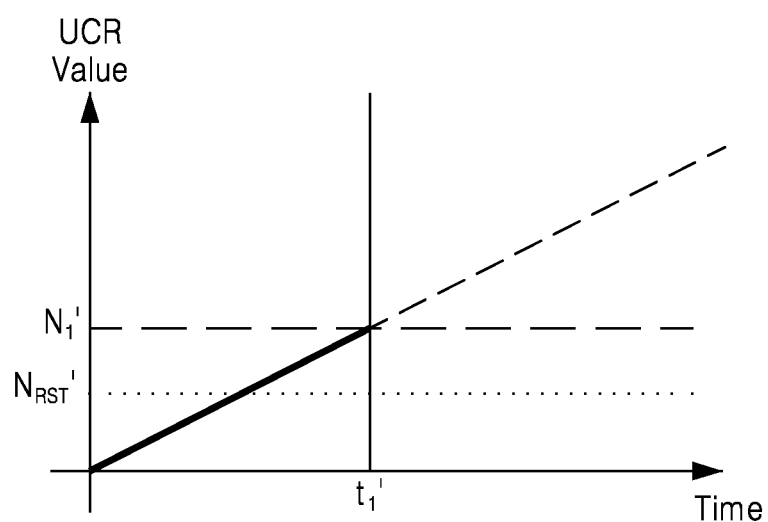
Figure 5B:
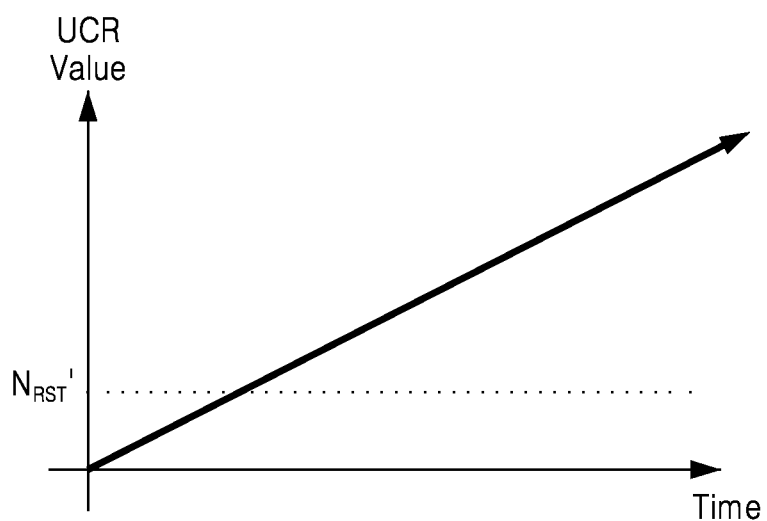

As illustrated in FIGS. 5A and 5B, when a count reset value $N_{RST}'$ is set at a certain time point $t_1'$ and the count reset value $N_{RST}'$ is less than a UCR value of N1' at the certain time point $t_1'$, the UCR value does not become the same as the count reset value $N_{RST}'$, and therefore, the UCR value continuously increases. In this case, the interrupt request signal IRQ is not generated.

When the count reset value $N_{RST}'$ is less than the UCR value of N1' at the certain time point $t_1'$, a time delay may have occurred that caused the setting of the count reset value $N_{RST}'$ to be delayed for some particular reason, and as a result the count reset value $N_{RST}'$ has become less than the UCR value of N1' at the certain time point $t_1'$. The delay may occur, for example, because the internal operating clock signal DCLK input by the prescaler/divider 110 is not synchronous with a bus clock signal input through the second bus 800. However, other reasons for delay are possible, and the scope of the present disclosure is not restricted to the example above. For example, a delay may have occurred, or an incorrect timing of the setting of the count reset value may have been caused by a programmer's mistake. The particular reason for delay may be any reason that may cause the time delay.

Figure 6A:
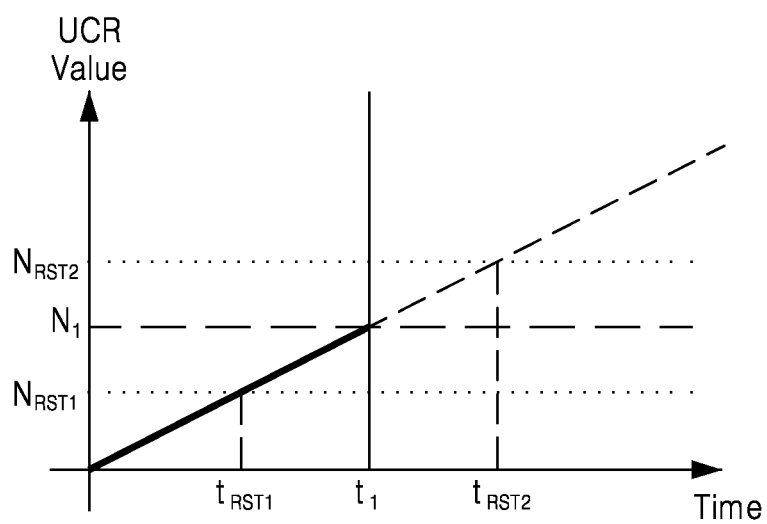
FIGS. 6A and 6B are diagrams for explaining implementation of system time according to some other embodiments.
Figure 6B:
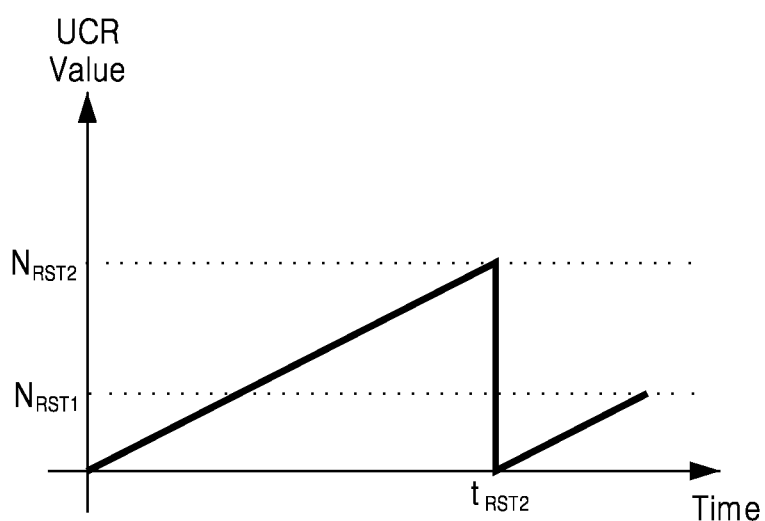

FIGS. 6A and 6B are diagrams for explaining implementation of system time according to some other embodiments.

Referring to FIGS. 6A and 6B, in one embodiment, two count reset values $N_{RST1}$ and $N_{RST2}$ may be stored. For example, the first $N_{RST1}$ may be a desired count reset value, and the second $N_{RST2}$ may be a backup count reset value. At a certain time point $t_1$, the two count reset values may be stored (e.g., they may be changed from two previous count reset values). The first count reset value $N_{RST1}$ may be less than the UCR value of N1 at the certain time point $t_1$ due to time delay or a programmer's mistake, but the second count reset value $N_{RST2}$ may be greater than the UCR value of N1 at the certain time point $t_1$.

Accordingly, the UCR value is reset to 0 at a time point $t_{RST2}$ at which the UCR value is the same as the second, backup count reset value $N_{RST2}$. Thereafter the UCR value may be reset using the desired count reset value $N_{RST1}$, and the backup count reset value $N_{RST2}$ may no longer be needed. In one embodiment, the UTR block 132 may have one or more registers for the UCR value and for one or each of the two count reset values $N_{RST1}$ and $N_{RST2}$ used to cause the reset. For example, a first register may be configured to increase the count value in synchronization with the second, divided clock signal and store the first, desired count reset value received from the first buffer, and a second register may be connected to the first register and may determine whether the count value is the same as the first count reset value, and reset the count value when it is determined that the count value is the same as the first count reset value at the first particular time. Similar registers may be used for the second count reset value $N_{RST2}$.

Since the two count reset values $N_{RST1}$ and $N_{RST2}$ are stored in the embodiments illustrated in FIGS. 6A and 6B, even when the first count reset value $N_{RST1}$ is less than the UCR value of N1 at the certain time point $t_1$ due to time delay or a programmer's mistake, the second count reset value $N_{RST2}$ may be greater than the UCR value of N1 at the certain time point $t_1$. Accordingly, a situation does not happen where the UCR value is not the same as the count reset value $N_{RST}'$ as shown in FIGS. 5A and 5B. As a result, the UCR value does not increase continuously.

By using the method described in FIGS. 6A and 6B, the timer 100 may generate the interrupt request signal IRQ through the TIG 140 in every fixed period defined by the first count reset value and second count reset value, and the system time may be updated in the fixed period.

Using the two count reset values described above, the timer 100 may provide a variable period. In this case, the ECB 120 may change the count reset value to provide the variable period. When the variable period is provided by the timer 100, the system time can be updated when needed, and therefore, power consumed by the timer 100 can be reduced.

FIGS. 7A and 7B are diagrams for explaining system time with a variable period according to some embodiments. Referring to FIG. 7A, the ECB 120 may change a period from 4 to 3 by changing two count reset values (e.g., a desired count reset value and a backup count reset value) at a certain time point $T_C$. Normally, the time point $T_C$ would occur prior to the count reaching 3 (i.e., before the counter value gets to 2), such that the counter resets to reflect the new period. However, in FIG. 7A, there is a delay $t_{delay}$ that causes the time point for changing the two count reset values to delay until $T_{CDELAY}$. At that point, even though the desired count reset value may be lower than the UCR counter value, the second count reset value is a greater value than UCR value at the certain time Tc, so the period may be changed from 4 to 3 within the changed period of 3 (i.e., before t+3) and a problem where the counter fails to be reset, or is only reset after the period of 3 from the certain time point $T_C$ does not occur.

As shown in FIG. 7B, in some cases a smaller delay may occur and/or the instruction to change the UCR counter values may occur early enough so that the second, backup count reset value is not needed. Nonetheless, including the backup count reset value is still used as a backup, in case the delay or timing causes a situation such as shown in FIG. 7A.

Figure 8B:
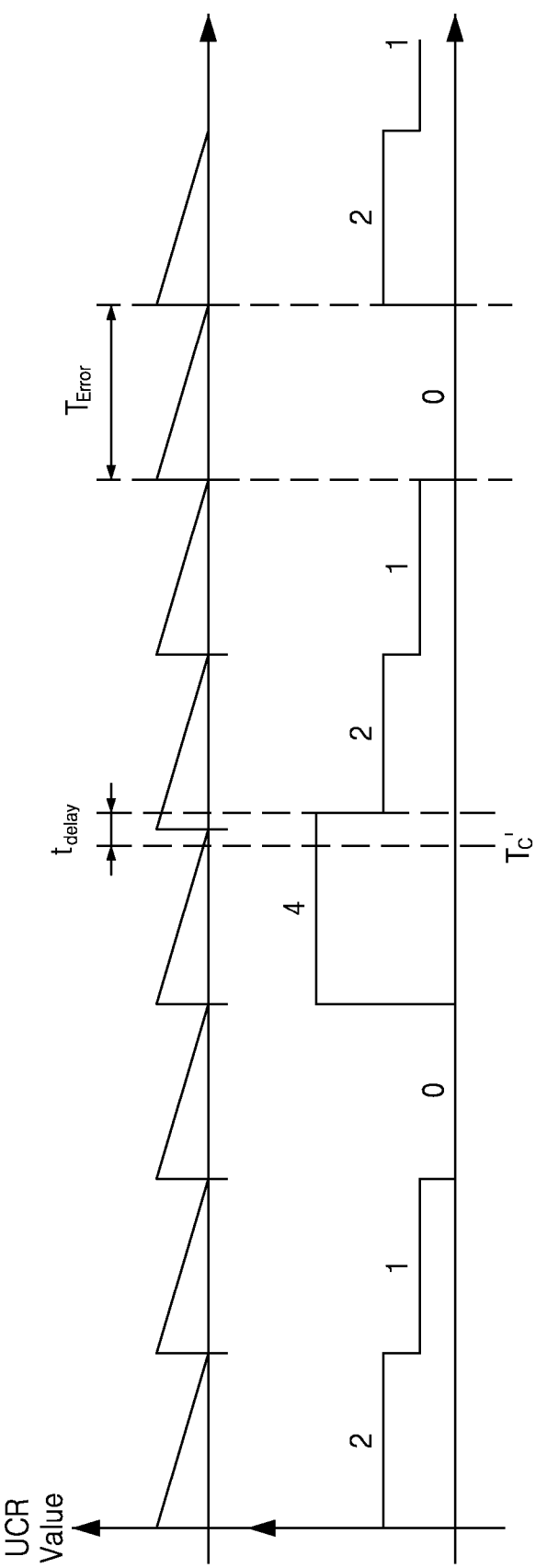

On the contrary, there is a problem in a comparison example of the system time with a variable period illustrated in FIGS. 8A and 8B.

Referring to FIGS. 8A and 8B, the variable period of a system is updated by two timers, i.e., a fixed period down-counting timer and an interrupt timer.

In FIGS. 8A and 8B, a graph illustrated in the upper part shows a period of the fixed period down-counting timer and a graph illustrated in the lower part shows a period of the interrupt timer. The fixed period down-counting timer has a fixed period of 1 and performs down-counting. The period of the interrupt timer is set to 5.

When it is intended to update the system time in three periods of the fixed period down-counting timer, a time point at which system time update delay time $t_{delay}$ has elapsed from the certain time point $T_C'$ is within the period of the fixed period down-counting timer in a case shown in FIG. 8A, and therefore, the system time is updated in the three periods of the fixed period down-counting timer from the certain time point $T_C'$. Accordingly, there is no problem.

However, in a case shown in FIG. 8B, a time point at which system time update delay time $t_{delay}$ has elapsed from the certain time point $T_C'$ is over the period of the fixed period down-counting timer, and therefore, the system time is updated not in three periods but in four periods of the fixed period down-counting timer from the certain time point $T_C'$. As a result, a time error $T_{Error}$ of 1 period occurs. In addition, since the comparison example uses two timers, it is less economical than the embodiments discussed above.

Accordingly, even when the period of the system time is changed in the embodiments discussed above, accuracy is maintained.

The embodiments of the present disclosure can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present embodiments can be easily construed by programmers skilled in the art to which the present disclosure pertains.

As described above, according to some embodiments, a timer and an IC device including time are easily realized and have increased accuracy and stability. In addition, users do not need to directly input an occurrence period of an interrupt to the timer.

While the present disclosure has been particularly shown and described with reference to exemplary embodiments, it will be understood by those of ordinary skill in the art that various changes in forms and details may be made therein without departing from the spirit and scope of the present disclosure as defined by the following claims.

What is claimed is:

1. A timer comprising:
   a first buffer configured to set a first count reset value;
   a second buffer configured to set a second count reset value;
   a register block configured to receive the first and second count reset values from the first and second buffers, respectively, increase a count value, and reset the count value when the count value is the same as the first count reset value at a first particular time or when the count value is the same as the second count reset value at a second particular time; and
   a timer interrupt generator configured to receive reset information that the count value is reset from the register block and generate an interrupt request signal,
   wherein the first buffer is configured to change the first count reset value and generate a changed first count reset value,
   wherein the second buffer is configured to change the second count reset value and generate a changed second count reset value, and
   wherein each of the changed first and second count reset values is generated during increasing the count value.

2. The timer of claim 1, wherein the second count reset value is greater than the first count reset value.

3. The timer of claim 1, further comprising a divider configured to divide a frequency of a first clock signal received from a clock generator and transmit a second clock signal divided from the first clock signal to the register block, wherein the register block increases the count value in synchronization with the second clock signal.

4. The timer of claim 3, wherein the register block comprises:
   a first register configured to increase the count value in synchronization with the second clock signal and store the first count reset value received from the first buffer; and
   a second register configured to be connected to the first register and to determine whether the count value is the same as the first count reset value and reset the count value when it is determined that the count value is the same as the first count reset value at the first particular time.

5. A system comprising:
   a central processing unit; and
   the timer of claim 1, wherein the timer is connected with the central processing unit by using a bus.

6. A method of implementing a system time in an electronic device using a timer, the method comprising:
   storing a first count reset value and a second count reset value greater than the first count reset value in the electronic device;
   increasing a count value;
   comparing the first and second count reset values with the count value at a first particular time and a second particular time, respectively;
   resetting the count value when the count value is the same as the first count reset value at the first particular time;
   resetting the count value when the count value is the same as the second count reset value at the second particular time;
   generating an interrupt request signal when the count value is reset;
   changing the first count reset value to a third count reset smaller than the first count reset value, and storing the third count reset value in the electronic device; and
   changing the second count reset value to a fourth count reset value smaller than the second count reset value, and storing the fourth count reset value in the electronic device,
   wherein changing the first and second count reset values occurs during increasing of the count value.

7. The method of claim 6, further comprising:
   dividing a frequency of a first clock signal received from a clock generator and generating a second clock signal divided from the first clock signal; and
   increasing the count value in synchronization with the second clock signal.

8. The method of claim 7, wherein the clock generator is positioned inside or outside the timer.

9. The method of claim 6, wherein the
   changing the first and second count reset values occurs at a third particular time between the first particular time and the second particular time, wherein at the third particular time, the count value is greater than the third count reset value, and less than the fourth count reset value.

10. A method of operating a timer in an electronic device, the method comprising:
    storing a first count reset value and second count reset value greater than the first count reset value in the electronic device;
    increasing a count value;
    comparing the count value with the first count reset value and the second count reset value at a particular time;
    resetting the count value when the count value is the same as the first count reset value or the second count reset value at the particular time;

generating an interrupt request signal when the count value is reset;
changing the first count reset value to a third count reset value smaller than the first count reset value, and storing the third count reset value in the electronic device; and
changing the second count reset value to a fourth count reset value smaller than the second count reset value, and storing the fourth count reset value in the electronic device,
wherein changing the first and second count reset values occurs during increasing of the count value.

11. The method of claim 10, further comprising:
dividing a frequency of a first clock signal;
transmitting a second clock signal divided from the first clock signal; and
increasing the count value in synchronization with the second clock signal.

* * * * *